March 18, 1969  T. J. MUSANTE  3,433,449

DECORATIVE SUPPORTING HOOK ASSEMBLY

Filed May 10, 1967

INVENTOR.
THOMAS J. MUSANTE
BY
William A. Zalesak
Attorney

United States Patent Office 3,433,449
Patented Mar. 18, 1969

3,433,449
DECORATIVE SUPPORTING HOOK ASSEMBLY
Thomas J. Musante, Newark, N.J., assignor to Necessa Products Company, East Orange, N.J., a partnership
Filed May 10, 1967, Ser. No. 637,592
U.S. Cl. 248—497         3 Claims
Int. Cl. A47g 1/16

ABSTRACT OF THE DISCLOSURE

A decorative supporting hook assembly including a hook member of strip material having a hook on one end thereof and a fold near the opposite end thereof, a decorative cover piece overlaying said hook member while exposing said hook, and said cover piece having a tapered cavity for frictionally receiving said fold.

Background of the invention

This invention relates to structures previously used such as the structure shown in my Patent 3,216,680. Much material was unnecessarily used and structure was more complicated.

Summary of the invention

In my present structure and method of manufacture, I am able to use ⅜₆ inch round edge wire fed into a four slide machine from 200 pound coils instead of 250 pound coils. The strip is fed sideways. The press forces in step one come together from front to back and then in step two the machine causes forces to come together from the sides to complete all stamping and binding operations (see FIGURE 8).

Waste is reduced to a minimum. Little maintenance is required on the stamping machines including the dies.

Description of the preferred embodiment

Figure 1:
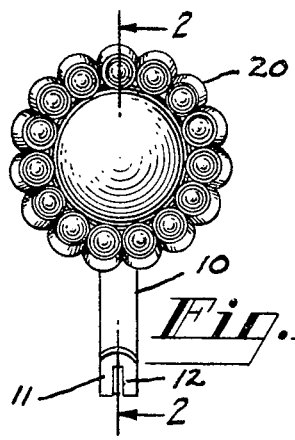
FIGURE 1 is a front elevation of a decorative supporting hook assembly made according to my invention.

Referring to the drawings, a decorative supporting hook made according to my invention includes a back member of strip material 10, having a hook member 11 extending from one end thereof. To add rigidity I form an embossment 12 in the hook portion. The back member 10 is provided with an aperture 13 through which a nail may be driven into the supporting surface. The back member is provided with a fold or loop 14 which engages the tapered recess of the cover or medallion 20.

Figure 2:
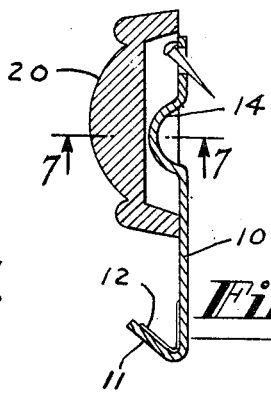
FIGURE 2 is a section taken along the line 2—2 of FIGURE 1.
Figure 3:
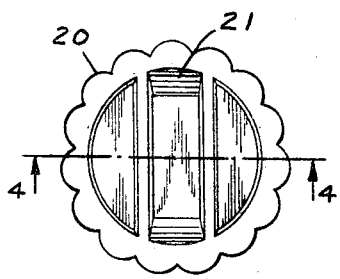
FIGURE 3 is a rear view elevation of FIGURE 1 without the hook assembly.
Figure 4:
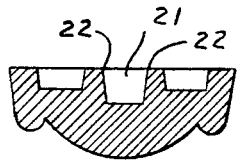
FIGURE 4 is a section taken along the line 4—4 of FIGURE 3.
Figure 5:
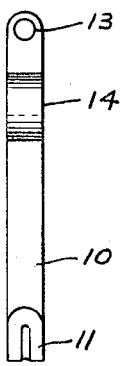
FIGURE 5 is an elevation of the hook assembly.
Figure 6:
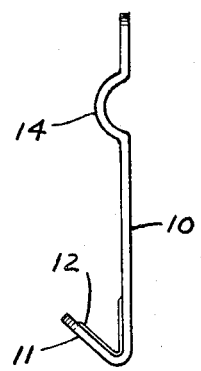
FIGURE 6 is a side elevation of FIGURE 5.
Figure 7:
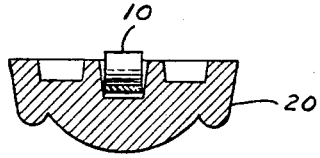
FIGURE 7 is a section taken along the line 7—7 of FIGURE 2.
Figure 8:
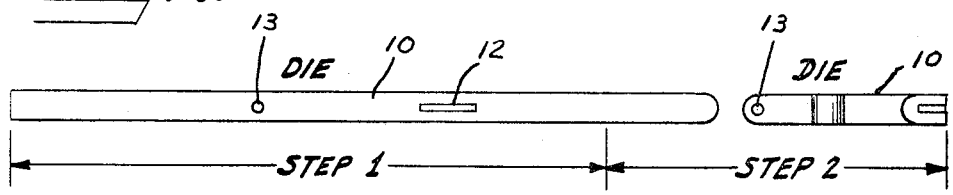
FIGURE 8 illustrates the method of forming the hook.

As best shown in FIGURES 2, 4 and 7, the medallion is provided with a cavity 21 having tapered sides 22, tapered inwardly toward the bottom. After the hook member is secured to the supporting surface, the medallion can be pushed over the hook and adjusted up or down. As the medallion is pushed down, the spacing between the sides of the walls of the recess and the hook member become such that contact is established and the medallion has a tight frictional contact, holding the medallion in place.

I claim:
1. A decorative supporting hook assembly including
   (1) a hook member of strip material having a hook on one end thereof and a fold near the opposite end thereof,
   (2) a decorative cover piece overlaying said hook member while exposing said hook, and
   (3) said cover piece having a tapered cavity for frictionally receiving said fold.
2. A decorative supporting hook assembly including
   (1) a hook member of strip material having a hook on one end thereof and a fold near the opposite end thereof,
   (2) a decorative cover piece overlaying said hook member while exposing said hook,
   (3) said cover piece having a tapered cavity for frictionally receiving said fold, and
   (4) said cover piece being adjustable with respect to said hook member.
3. A decorative supporting hook assembly including
   (1) a hook member of strip material having a hook on one end thereof and a fold near the opposite end thereof,
   (2) a decorative cover piece overlaying said hook member while exposing said hook,
   (3) said cover piece having a tapered cavity for frictionally receiving said fold,
   (4) said cover piece being adjustable with respect to said hook member, and
   (5) said hook having an embossed portion for rigidity.

References Cited

UNITED STATES PATENTS

| | | | |
|---|---|---|---|
| 1,025,964 | 5/1912 | Costuma | 248—493 |
| 1,757,739 | 5/1930 | Rosenblum | 248—493 |
| 1,797,815 | 3/1931 | Bernhard | 248—493 |
| 3,216,680 | 11/1965 | Musante | 248—304 X |
| 3,273,845 | 9/1966 | Jepsen | 248—226 |

ROY D. FRAZIER, Primary Examiner.

J. FRANKLIN FOSS, Assistant Examiner.

U.S. Cl. X.R.
248—217, 301, 304